(12) United States Patent
Cole et al.

(10) Patent No.: US 8,045,060 B2
(45) Date of Patent: Oct. 25, 2011

(54) ASYNCHRONOUS CAMERA/PROJECTOR SYSTEM FOR VIDEO SEGMENTATION

(75) Inventors: James R. Cole, Albany, OR (US); Brad Allen, Salem, OR (US); Dennis R. Esterberg, Philomath, OR (US); Jeff Bakkom, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1421 days.

(21) Appl. No.: 11/542,859

(22) Filed: Oct. 4, 2006

(65) Prior Publication Data
US 2008/0084508 A1    Apr. 10, 2008

(51) Int. Cl.
*H04N 9/75* (2006.01)
*H04N 9/74* (2006.01)

(52) U.S. Cl. ......................... 348/592; 348/587
(58) Field of Classification Search .................. 348/586, 348/587, 591, 592; 345/620, 624, 625, 629, 345/634, 589, 592
See application file for complete search history.

(56) References Cited

U.S. PATENT DOCUMENTS

| | | | |
|---|---|---|---|
| 2,886,636 A | 5/1959 | Grace | |
| 4,122,890 A * | 10/1978 | Atkins et al. | 164/444 |
| 4,811,084 A * | 3/1989 | Belmares-Sarabia et al. | 348/592 |
| 4,928,301 A | 5/1990 | Smoot | |
| 5,400,069 A | 3/1995 | Braun et al. | |
| 5,737,031 A * | 4/1998 | Tzidon et al. | 348/587 |
| 5,886,747 A | 3/1999 | Tzidon et al. | |
| 6,104,438 A * | 8/2000 | Saito | 348/587 |
| 6,361,173 B1 | 3/2002 | Vlahos et al. | |
| 6,441,865 B1 * | 8/2002 | Hailey | 348/586 |
| 6,490,006 B1 | 12/2002 | Monjo | |
| 6,616,281 B1 | 9/2003 | Vlahos et al. | |
| 7,042,486 B2 | 5/2006 | Manico et al. | |
| 2005/0099603 A1 | 5/2005 | Thomas et al. | |

* cited by examiner

*Primary Examiner* — Victor Kostak

(57) ABSTRACT

An asynchronous camera/projector system includes a projection screen, having a key color, a projector, oriented to provide a sequenced background image to the screen, and a camera, located in front of the screen, and oriented to capture a sequenced image of the screen and a real object positioned in front of the screen. The camera and projector operate out of phase, so that the camera does not record the background image.

16 Claims, 7 Drawing Sheets

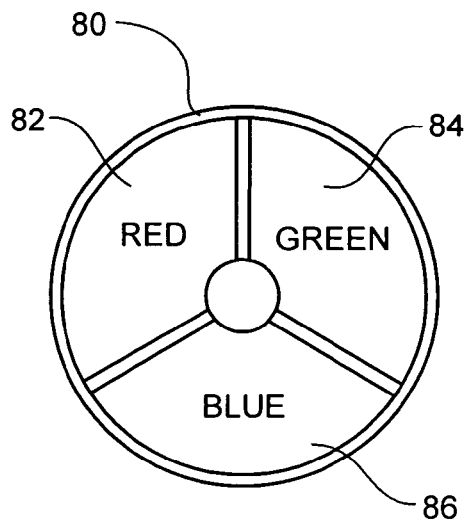
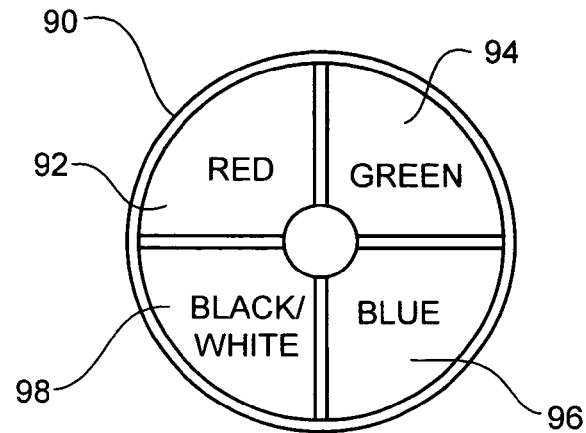
FIG. 4          FIG. 5
|  | FRAME 1 | | | FRAME 2 | | |
|---|---|---|---|---|---|---|
| PROJECTOR | R | G | B | R | G | B |
| CAMERA | B | R | G | B | R | G |
FIG. 6
|  | FRAME 1 | | | | FRAME 2 | | | |
|---|---|---|---|---|---|---|---|---|
| PROJECTOR | R | G | B | W | R | G | B | W |
| CAMERA | B | R | G | K | B | R | G | K |
FIG. 7

ASYNCHRONOUS CAMERA/PROJECTOR SYSTEM FOR VIDEO SEGMENTATION

BACKGROUND

Chroma key (aka "bluescreen" or "greenscreen") systems are used to create an image that combines a background still or video image (high-quality computer-generated graphics, for example) with video capture of a real object, such as a human being. Perhaps the most well known example of the use of chroma key systems is that of a television weatherman standing in front of a computer-generated weather map explaining the weather, while manipulating various graphical and video displays that appear behind him to illustrate the weather. This technology is also widely used in the television and movie industry, such as to combine live action in a studio setting (e.g. a close-up of an actor driving an automobile) with a pre-recorded background image (e.g. a street scene that could be visible through the rear window of the automobile).

A typical chroma key system 10 is illustrated in FIG. 1. A person 12 (or other real object) is positioned in front of a monochromatic surface 14, typically blue or green. The color of the surface is called the "chroma key." A camera 16 captures an image of the person (or object), and this image provides one input into a chroma key processor 18.

A second input to the chroma key processor 18 is provided from a background image processor 20, which provides background image data, such as a high-quality computer-generated image. The chroma key processor combines the background image and the image of the real object by replacing the chroma key color with the background image. In the present example, the portion of the video image window that is occupied by the person 12 blocks the background image in that region, so that the background image does not appear. Wherever the chroma key color is detected, however, the background image persists. The result is a composite image 22 in which the person 12 appears to be standing in front of the high-quality computer-generated background image. This composite image is broadcast to viewers, who see only the final composite image, and may not even realize that it is a composite image.

In the real scene, however, the background image is not visible, and the background surface 14 appears to the person 12 (and other viewers of the real scene) as a featureless monochromatic surface. Hence, the person in the scene cannot directly interact with the background image. To provide feedback to the person, a monitor 24 is typically placed off-screen, and provided with the composite output 22 from the chroma key processor 18. By watching this monitor, the person can see their position in the composite image, such as to see where they appear to be pointing, etc. Unfortunately, interacting with the background image in a convincing way with this sort of system requires much practice, especially if the goal is to keep the viewer unaware of the whole process.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein:

FIG. 4 is a plan view of a three-segment color wheel that can be used with a camera or projector in an embodiment of an asynchronous camera/projector system in accordance with the present disclosure;

FIG. 5 is a plan view of a four-segment color wheel that can be used with a camera or projector in an embodiment of an asynchronous camera/projector system in accordance with the present disclosure;

FIG. 6 is a table depicting an asynchronous color sequence that can be used in an embodiment of an asynchronous camera/projector system in accordance with the present disclosure;

FIG. 7 is a table depicting an alternate asynchronous color sequence that can be used in an embodiment of an asynchronous camera/projector system in accordance with the present disclosure;

DETAILED DESCRIPTION

Figure 1:
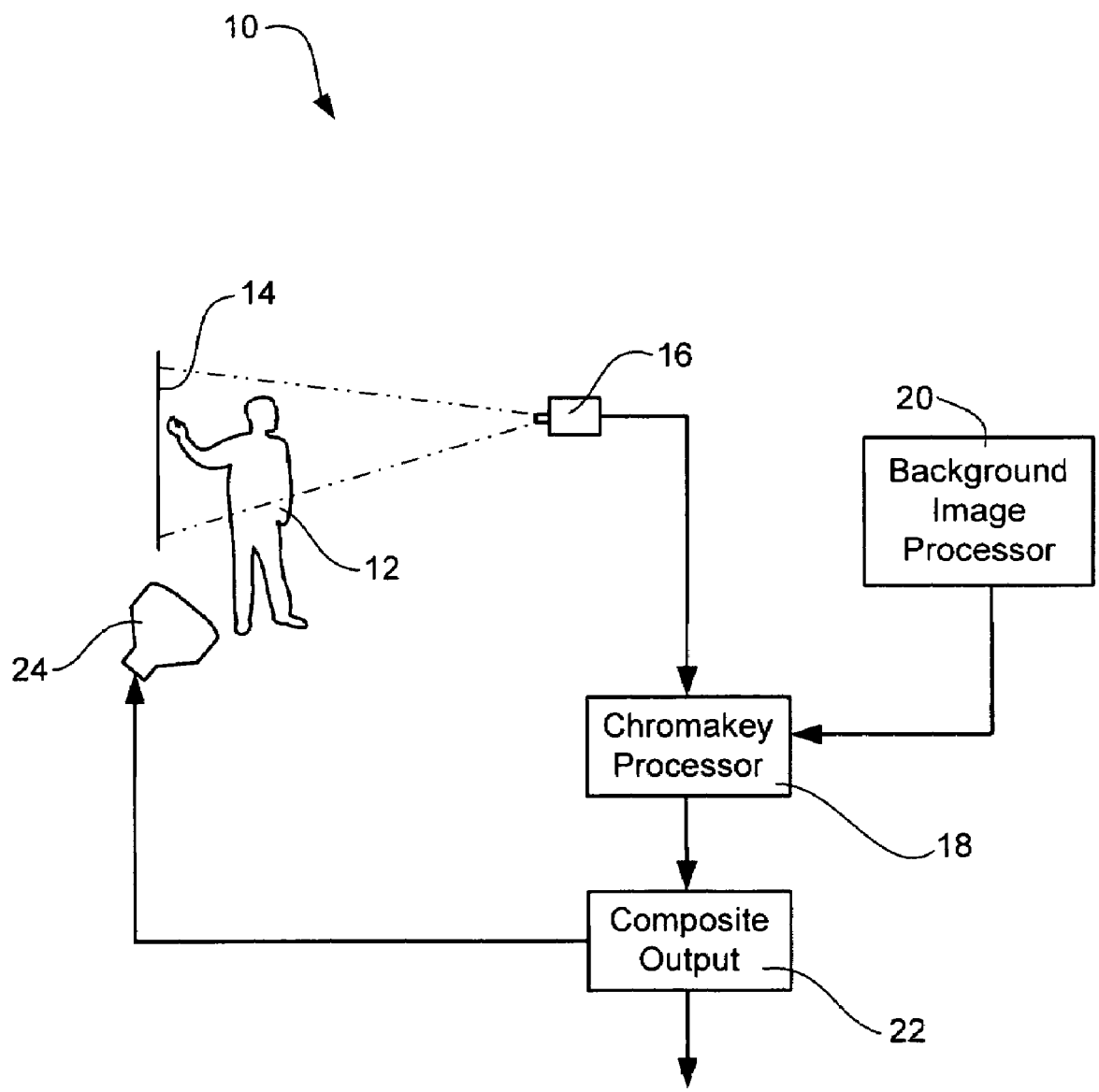
FIG. 1 is a schematic diagram of a typical chroma key video segmentation system.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 2A:
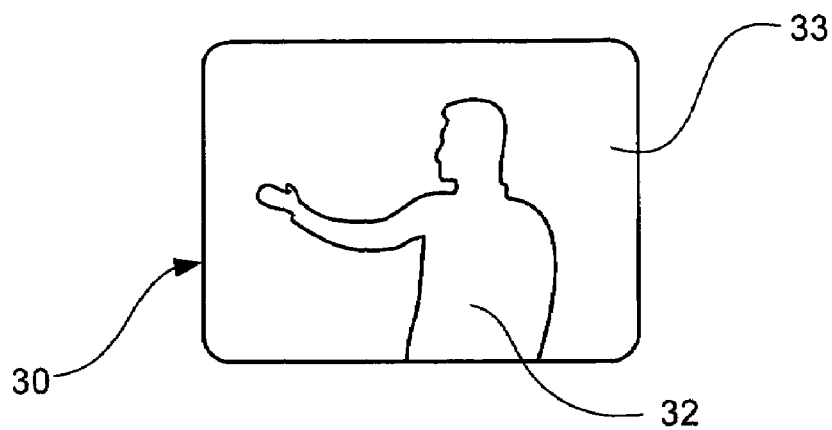
FIG. 2A is an exemplary representation of a real object image obtained by the camera in a chroma key video segmentation system.
Figure 2B:
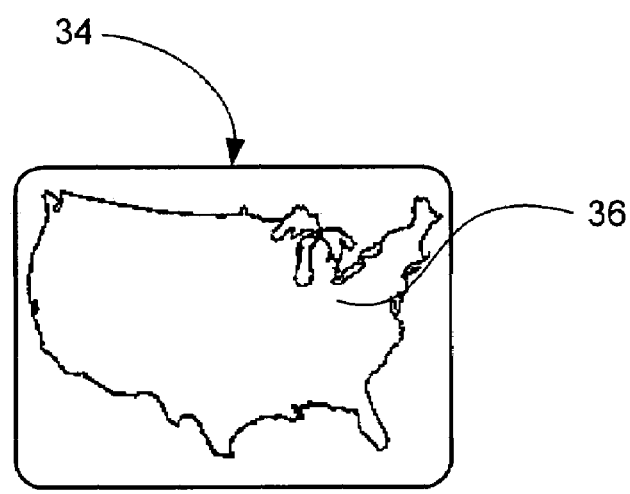
FIG. 2B is an exemplary representation of a background image that can be used in a video segmentation system.
Figure 2C:
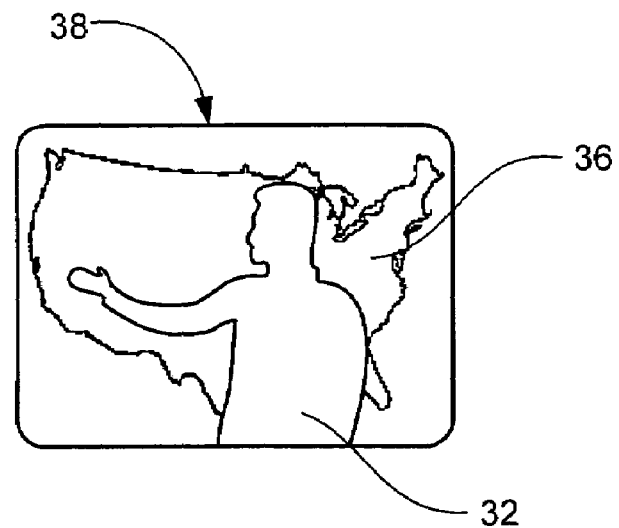
FIG. 2C is an exemplary representation of a composite image produced by a video segmentation system, comprising the real object image of FIG. 2A superimposed upon the background image of FIG. 2B.

As noted above, chroma key systems are commonly used to create a composite image that combines a background video image with video capture of a real object, such as a human being. Shown in FIGS. 2A-2C are exemplary representations of image components and a composite image that can be created using a video segmentation system like that shown in FIG. 1. Viewing FIG. 2, the camera (16 in FIG. 1) produces a real object scene 30 that comprises an image of the real object 32 (in this case a person), with a background 33 that is either partially or entirely occupied by the background surface (14 in FIG. 1) that is the key color (e.g. blue or green).

Referring to FIG. 2B, the background scene 34 comprises any background video image 36 (or multiple images) that is/are desired for a background. This video image can be computer graphics, moving video, a still photograph, or a combination of these or other elements that have been prepared as a single video signal. For example, the background image can be a computer-generated weather map, video from a news event, a scenic photograph, or a virtual television studio.

Viewing FIG. 2C, the chroma key processor (18 in FIG. 1) combines the real object scene 30 with the background scene 34 to produce a single composite image 38. In this composite image, the background image 36 occupies all portions of the image frame that were previously the background key color (33 in FIG. 2A), while the real object image 32 occupies the foreground and, because the real person in the video image partially blocked the camera's view of the chroma key screen, blocks corresponding portions of the background image. The result is a composite image having the real video object in the foreground with a virtual background.

Video segmentation systems can also be employed to combine multiple background images with a live-action foreground image. For example, multiple chroma key screens of different colors can be included in the real image, with different background images corresponding to each key color. For example, a blue screen can allow the insertion of one background image, and a green screen can be provided to allow the insertion of a second background image. A multi-channel chroma key processor then combines the individual background images with the real image, to produce a composite image having more than one virtual background image.

As noted above, however, the background image is not visible to a person (12 in FIG. 1) in the real image scene (30 in FIG. 2A). Instead, the background surface appears as a featureless monochromatic surface, making it difficult for the person to interact with the video image. Interacting with the background image while viewing an off-screen monitor showing the composite image is difficult to do while keeping the viewer unaware of the process. Indeed, given the fixed positions of one or more off-screen monitors, some positions or motions of the person in the foreground may be impossible to do while still viewing the monitor.

Figure 3:
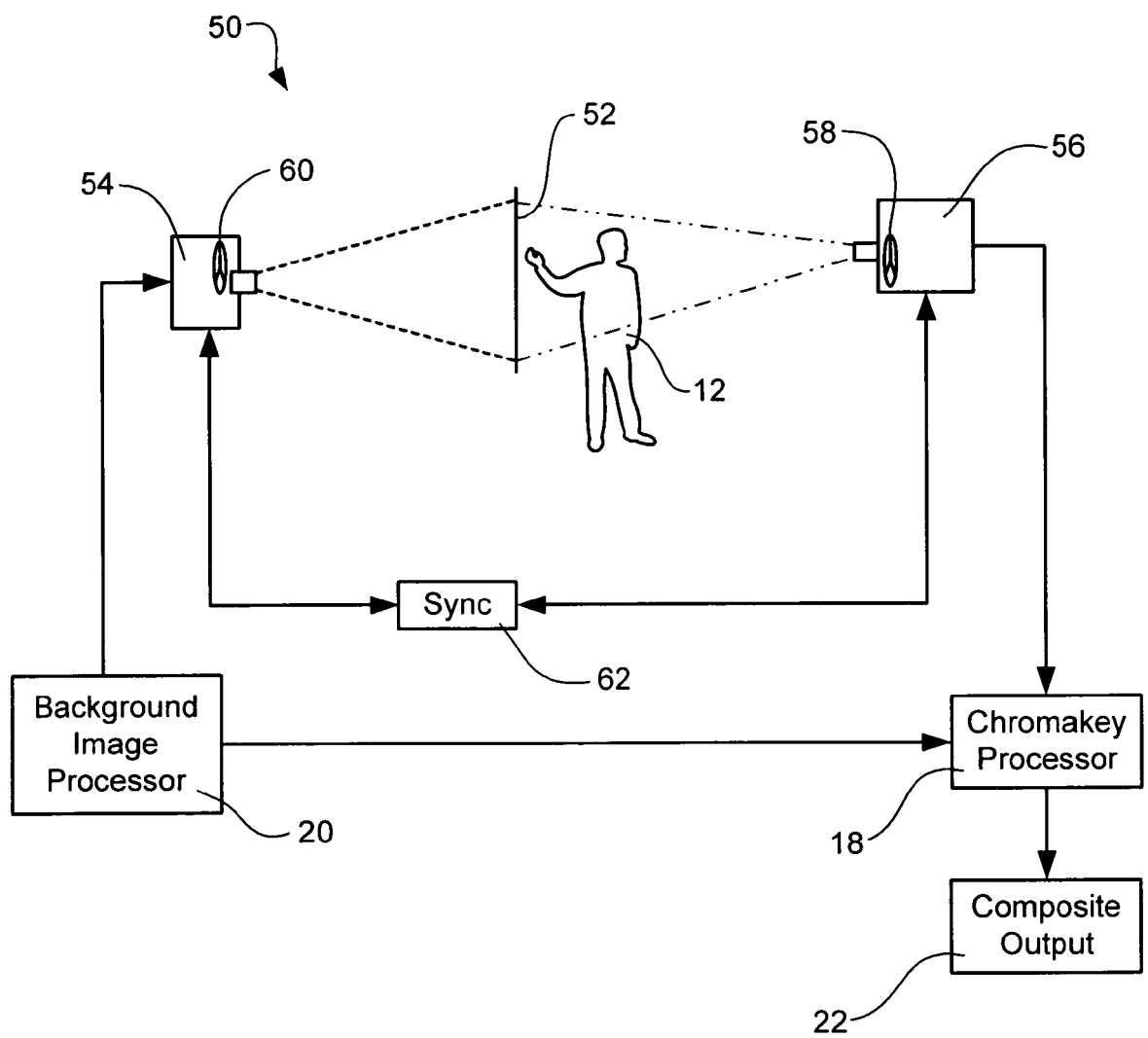
FIG. 3 is a schematic diagram of a chormakey video segmentation system incorporating an embodiment of an asynchronous camera/projector system in accordance with the present disclosure.

Advantageously, the inventors have developed an asynchronous projector/camera system that allows direct interaction with the background image. One embodiment of such a system is shown in FIG. 3. In this embodiment of an asynchronous projector/camera system 50, the monochromatic background surface or wall (14 in FIG. 1) is replaced with a rear-projection screen 52 that has the desired key color (e.g. blue or green). The screen can include an appropriate amount of tint so that the chroma key processor can be used to directly combine the real image of the person with the background image data in the standard way, to produce the composite image. A camera 56 is positioned to record an image of the foreground object 12 (e.g. a person), with the screen occupying part or all of the background, in the same manner as typical chroma key systems.

Unlike prior systems, however, a rear-projection projector 54 is located behind the screen 52, and projects a background image onto the screen based upon image data from a background image processor 64. This background image on the screen is visible to the person 12 in front of it, because the projector and the camera are operating asynchronously, thus allowing the person to interact with the image directly. That is, the image being detected by the camera at any given time is different than the image projected to the screen at that time, so that the camera does not "see" the image that is on the screen. Instead, the background image data is fed directly to the chroma key processor 66 along with the real object image from the camera, and the two images are combined by the chroma key processor in the same manner as in prior systems, to produce the composite output 68. The result is the same as that depicted in FIGS. 2A-2C, but now the person can interact with the background image directly.

As used herein, the term "asynchronous" is intended to refer to two devices (the camera and projector) that are operating out of phase with each other, so that the operation of one of the devices (the projector) is substantially not detectable by the other device (the camera). The camera and projector can be asynchronous in several ways. They can be chromatically asynchronous, temporally asynchronous, or spatially asynchronous. A chromatically asynchronous system is depicted in FIG. 3. In this system, the projector 54 is a sequential-color projector, which develops a full-color image by successively displaying separate color components of the image (such as red, green, blue) at high speeds. This can be done using a rotating color wheel 60 in the projector. Sequential color projectors using rotating color wheels are well known and widely commercially available. Examples of color wheels that can be used for sequential color projection are shown in FIGS. 4 and 5. A three-color color wheel 80 is shown in FIG. 4. This color wheel includes three color filter segments including a red segment 82, a green segment 84, and a blue segment 86, corresponding to the well known RGB color sequence used in color video. In this color wheel, each filter segment occupies an equal portion of the wheel (e.g. 120°).

The light filter segments of the color wheel sequentially pass in front of the projection light path as the color wheel rotates very rapidly, so as to produce sequential red, blue, and green sub-portions of a single image frame. For example, during each image frame of a video image (each image frame lasting, e.g. 1/30 second), a white light source in the projector will sequentially project three different sub-images (each lasting e.g. 1/90 second) through the color wheel filters in sync with the rotation of the color wheel. For example, the sub-image that is projected while the red filter segment of the color wheel is in the projection path will correspond to the red portions of the final image, the sub-image portion that passes through the green segment of the color wheel corresponds to green portions of the final image, and the sub-image portion that is projected while the blue segment of the color wheel is in the projection path corresponds to blue portions of the final image. Given the speed of projection of the three color images, the viewer does not perceive three different colors at different times, but instead sees a single image including the entire range of visible colors.

Another example of a color wheel is provided in FIG. 5. This color wheel 90 includes four color segments, including a red segment 92, a green segment 94, a blue segment 96, and a black or while segment 98, each segment occupying approximately one fourth of the color wheel. The term "black" as used with respect to the color wheel is intended to refer to an opaque or reflective segment which blocks or reflects substantially all projected light. This can be a segment of a solid metal piece (e.g. a piece of aluminum) or other material (e.g. glass) that has been treated to cause it to block light or to reflect light away from the projection path (e.g. to a light dump). The term "white" is intended to refer to a piece of clear or transparent material (e.g. clear glass or plastic) that passes substantially all visible light that is projected to it. It will be apparent that the three and four-segment color wheels shown in FIGS. 4 and 5 are only exemplary, and that color wheels having different numbers and types of filter segments can also be used to produce sequential color images.

Referring back to FIG. 3, the color wheel 60 in the projector 54 causes the projector to sequentially project the component color images to the rear projection screen 52, providing an image on the screen that is visible to the person 12 in front of the screen. On the opposite side of the screen from the projector, the camera 56 is a sequential-color camera that also includes a rotating color wheel 58, and operates analogously to the sequential color projector. A standard sequential color camera is designed with a rotating color wheel in the optical path. For each frame the camera takes, the wheel rotates an integer number of times. The color filters on the wheel are designed to filter out all but a desired color. For example, the red filter on the camera accepts only red light, and rejects blue and green.

The color wheel 58 of the camera is operationally linked with the color wheel 60 of the projector via a synchronization device 62, which simultaneously controls the speed of rotation and the relative positions of the color filters of the two color wheels. It is common for display systems (cameras and displays) to have a "genlock" capability, wherein one device generates a timing signal which is accepted by other devices in order for their video processing (frame rates) to be synchronized. The synchronization device 62 represents the components required to provide this capability, and though shown in FIG. 3 as a separate component of the system, these components can be part of the camera 56 or of the projector 54, or both. By virtue of the synchronization device, the frame rate of the camera is matched to the frame rate of the projector, and the color wheel rotation rate of the camera is synchronized with the color wheel rotation rate of the projector.

The color wheels in the projector and camera can be of identical design (i.e. having the same number and sequence of color filters), but are caused to rotate out of phase. That is, when the projector is projecting a given color in its sequence, the camera is filtering out that color and imaging a different color. This is done for each color in sequence. As noted above, the color filters on the color wheel 58 of the camera 56 are designed to accept only the equivalent colors from the projector. Thus, the red filter on the camera accepts only the red light from the projector, and rejects blue and green. It is not necessary for the band passes to be identical, so long as rejection of the alternate colors is adequate. It is also not necessary for the color wheel segments of the camera to be as large as the projector's. They can be somewhat smaller in order to simplify timing.

An example of an asynchronous color sequence for a camera/projector system wherein the camera and projector each have a three-segment color wheel having red (R), green (G) and blue (B) segments, is provided in FIG. 6. This table shows the color wheel positions during two successive image frames, labeled "Frame 1" and "Frame 2". During a first portion of Frame 1, the red ("R") filter segment of the projector color wheel is positioned in the projection path, so that the projector projects the red portion of the image frame, followed successively by the green ("G") and blue ("B") image components. This same projection sequence also follows in Frame 2.

The camera, on the other hand, takes the red, green and blue images in the same order, but shifted by one step in the sequence. That is, while the projector is projecting a red image, the camera is imaging a blue ("B") image, followed by red ("R") and green ("G"), while the projector projects green and blue, respectively. The same asynchronous color projection and imaging procedure follows for Frame 2.

Because the camera 56 and projector 54 are out of phase, the camera will not capture any light coming from the projector, and thus will not "see" the image being projected upon the screen. Consequently, the camera sees only the key color of the screen 52 in the background, and thus the real image and the background image can still be combined in the typical way, as illustrated in FIGS. 2A-2C. That is, the signal from the background image processor 64 and the real image signal from the projector 56 are combined by a chroma key processor 66, which produces the composite output 68.

Another example of a projection sequence for a chromatically asynchronous camera/projector system is shown in the table of FIG. 7. In this exemplary sequence, the camera and projector each have a four-segment color wheel. The color wheel of the projector includes red (R), green (G), blue (B) and white (W) segments, while the color wheel of the camera includes red (R), green (G), blue (B) and black (K) segments in a different order. During each image frame, the projector projects a sequence of R-G-B-W, while the camera sequentially images B-R-G-K. As with the example of FIG. 6, since the color sequences of the camera and projector are out of phase, the camera will not capture any light coming from the projector, and thus will not "see" the image being projected upon the chroma key screen.

A white portion of a projection sequence in a sequential color projector is often provided to increase the overall brightness of the projected image. During the white sub-frame, image data that is roughly equivalent to a "black and white" version of the background image is provided for parts of the scene that are fairly bright. This white image enhances the brightness of the image overall. A while color sub-frame can be desirable in a video segmentation system of this type in order to compensate for studio lighting. The increased brightness makes the background image more easily visible to the person interacting with it, notwithstanding the bright studio lights.

Since white light projected during the white sub-frame cannot be eliminated by a color filter segment, the color wheel in the camera includes a black (K) segment which is timed to block all light to the camera during the white phase. The black segment of the color wheel in the camera is part of the image-forming process during a frame, and is not really perceivable by a user. No specific compensation is needed in the camera or processor to account for the black segment. Due to the color wheel (including the color portions), the image captured by the camera will tend to be a little darker, but this is a common situation. Compensation for this condition can be easily provided by "faster" camera optics.

As noted above, in addition to varying the color sequence, the temporal sequence of projection and camera imaging can be made asynchronous to provide an interactive background image, while still using the typical video segmentation process for producing a composite image. Specifically, the projection of the projector and imaging of the camera can be temporally out of phase (without respect to color), so that the projector only projects an image part of the time, and the camera only captures an image part of the time, the two time intervals being opposite each other.

Figure 8A:
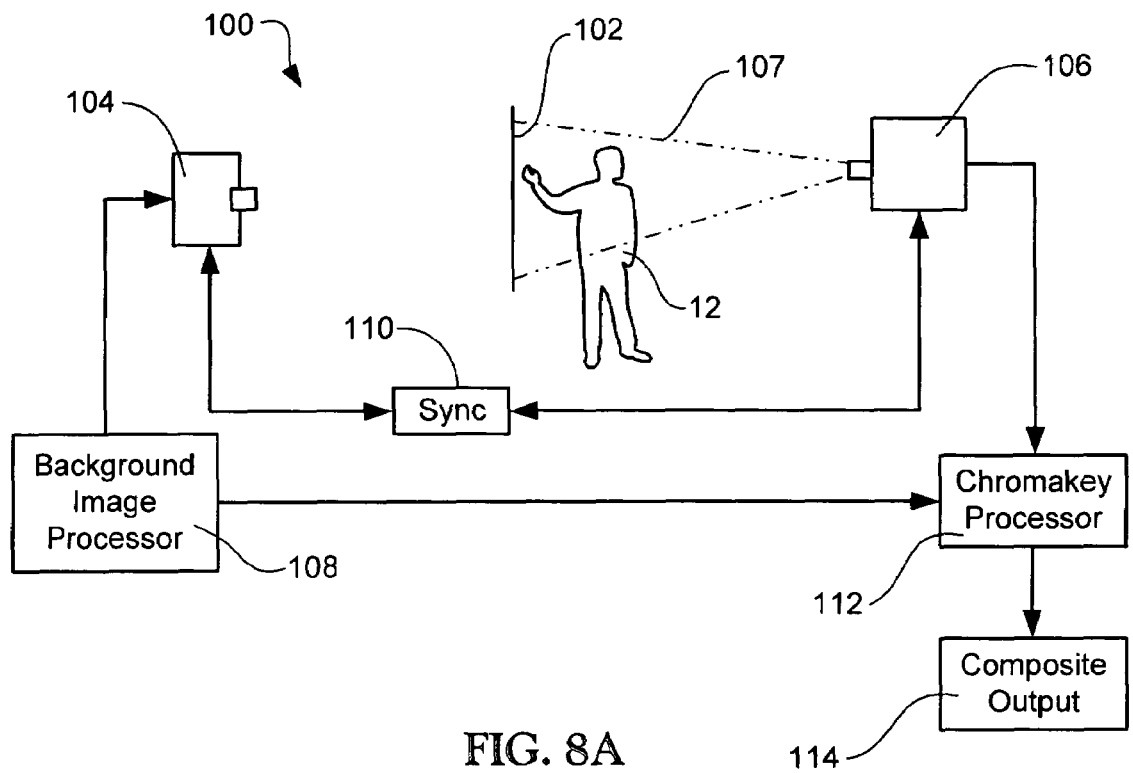
FIGS. 8A and 8B are schematic diagrams of one embodiment of a temporally asynchronous camera/projector system in accordance with the present disclosure.
Figure 8B:
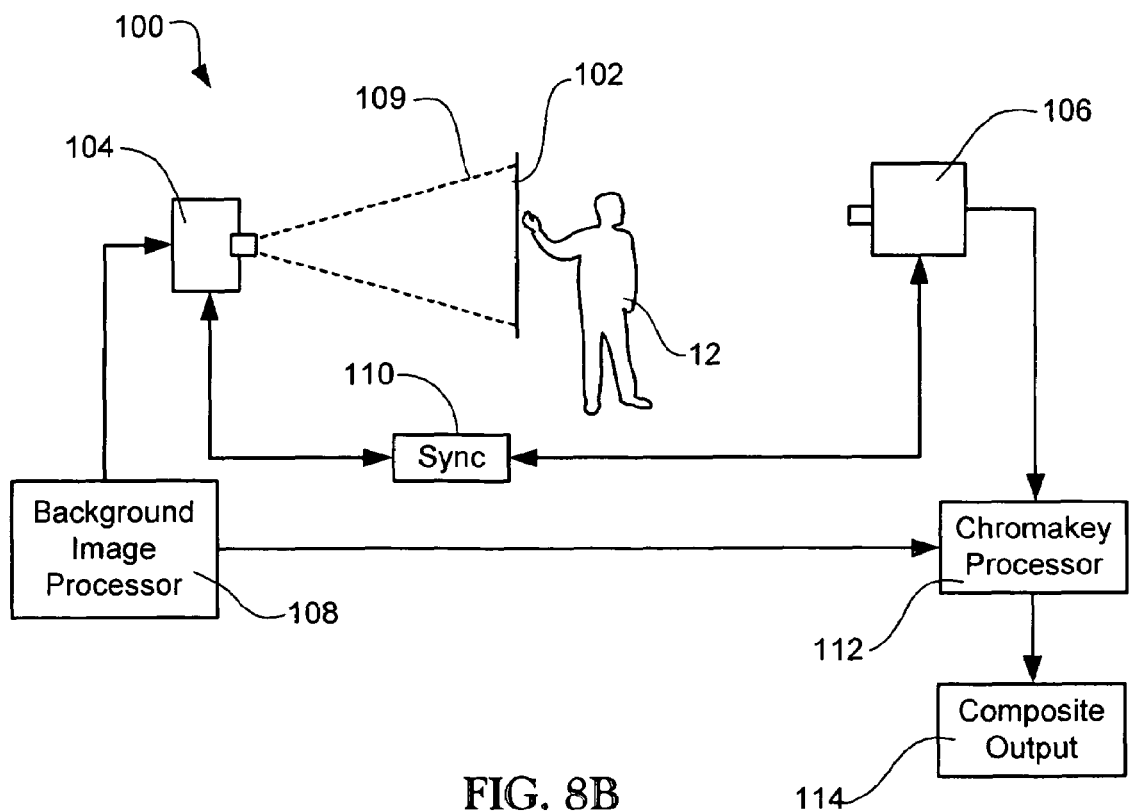

An example of a temporally asynchronous projector camera system 100 is depicted in FIGS. 8A and 8B. In this system the camera 106 is aimed at the monochromatic key color background screen 102 and the foreground real object, in this case a person 12. A signal representing the image 107 from the camera is sent to the chroma key processor 112, which also receives a background image signal from the background image processor 108, and combines these two images to produce the composite output 114.

At the time instant shown in FIG. 8A, the background projector 104 is not producing an image, but the camera 106 is taking an image. However, a subsequent time interval is illustrated in FIG. 8B, wherein the camera 106 is not taking an image, but the projector is producing an image 109, which the person can see. The imaging interval, illustrated in FIG. 8A, and the projection interval, represented in FIG. 8B, are very rapid and alternate with each other, so that the camera does not "see" the projected background image, but the person does. The timing of these intervals is governed by the synchronization unit 110, which interconnects the camera and the projector. The duration of the imaging and projection intervals can vary, and the two intervals can be different lengths. Moreover, while the configuration depicted in FIGS. 8A and 8B suggests two successive intervals, a different pattern of intervals can be used.

Figure 9:
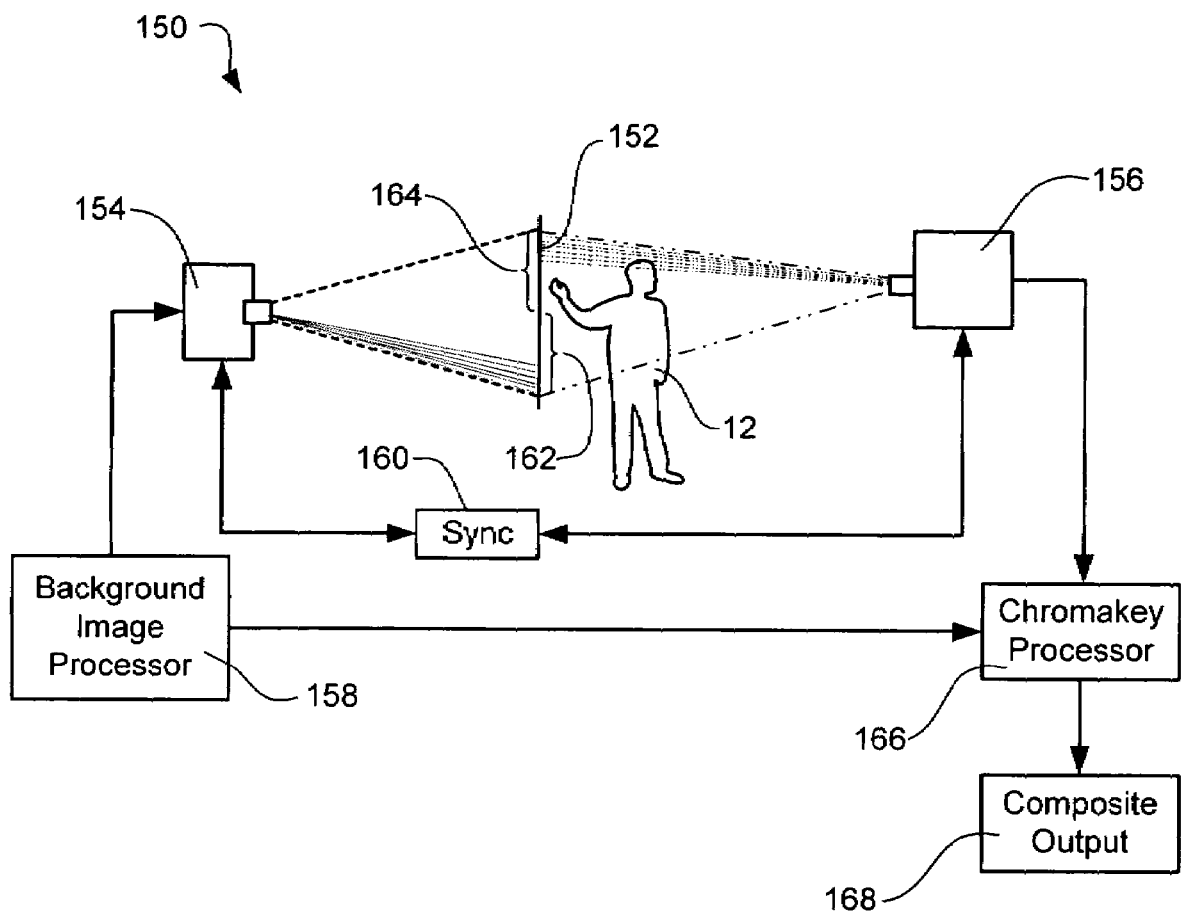
FIG. 9 is a schematic diagram of one embodiment of a spatially asynchronous camera/projector system in accordance with the present disclosure.

As yet another alternative, the camera and projector can be spatially asynchronous. One embodiment of a spatially asynchronous camera/projector system 150 is shown in FIG. 9. As with the embodiments that are described above, a projector 154 provides an image to a rear projection screen 152, which has a monochromatic color surface corresponding to the chroma key color. The camera 156 takes an image of a foreground object, in this case a person 12, with the key color screen behind. A signal representing the real image from the camera is sent to the chroma key processor 166, which also receives a background image signal from the background image processor 158, and combines these two images to produce the composite output 168.

Unlike the other embodiments described above, however, the camera 156 and projector 154 are configured to scan their images in a spatially different sequence. For example, as shown in FIG. 9, the projector can be a scanning laser projector which produces a moving image by repeatedly scanning horizontal lines of pixels from the top of the screen to the bottom. Likewise, the camera can be configured to take an image in a corresponding way, scanning horizontal lines of pixels repeatedly from top to bottom. Where both the camera and projector deal with images by spatially scanning in this way, the two devices can be coordinated to scan at a common frequency, but out of phase. That is, the projector can scan the bottom region of the screen, designated 162, while the camera takes an image from the top of the screen, designated 164, and vice versa. It will be apparent that a variety of spatially asynchronous scanning configurations can be used. For example, the camera and projector can scan from side to side, rather than from top to bottom, or in any one of many other scanning modes.

The asynchronous spatial scanning of the camera and projector is controlled by a synchronization device 160, which ensures that the two devices operate at the same frequency, but out of phase. Thus the camera will never detect the background image that is projected to the screen because its projection will always be in a different location on the screen than that from which the camera is taking an image. However, the person will be able to see the background image and interact with it.

Figure 10:
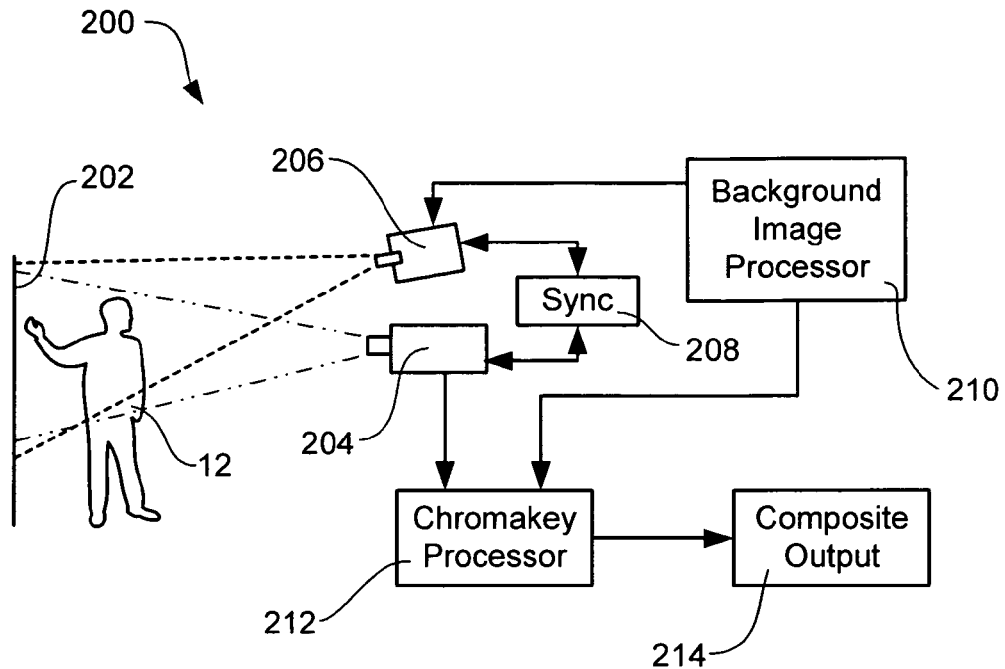
FIG. 10 is a schematic diagram of a chromakey video segmentation system incorporating an embodiment of an asynchronous camera/projector system having a front projector.

While the above-described embodiments are presented and described as using a rear projection screen, a chromakey video segmentation system incorporating an asynchronous camera/projector system as described herein can also be configured with a front projector. One embodiment of a front projection chroma key video segmentation system 200 is depicted in FIG. 10. As with embodiments described above, this system includes a key color screen 202, before which a person 12 or other foreground object is positioned. A camera 204 records the live scene, while a front projector 206 projects a background image onto the key color screen. The camera and projector are interconnected by a synchronization device 208, which ensures that the camera and projector are operated asynchronously (either chromatically, temporally, or spatially), as described above.

A background image processor 210 provides background image data to the projector 206, and also to a chroma key processor 212. The camera 204 also provides its live image signal to the chroma key processor, which combines the live image signal and the background image into a single composite output signal 214, in the manner described above.

It will be apparent that the front projector 206 in the embodiment of FIG. 10 will also tend to illuminate the person 12 (or other foreground object). Depending upon the position of the projector, this can have the effect of projecting the background image onto the person, and casting a corresponding shadow onto the key color screen 202. Advantageously, this will not affect the composite image because the camera 204 and projector are operating asynchronously. That is, since the camera never "sees" the projected background image, its projection onto the person (or a corresponding shadow in the key color screen) will not be noticeable except to persons directly viewing the live scene. In this configuration, the effect of shadowing on the screen can be mitigated to a certain extent by the person simply moving around to reduce and move shadows from areas that he desires to view.

At the same time, it can be desirable to partially or completely eliminate shadows cast upon the screen 202 by the person 12, and the person and other viewers of the live scene may find it objectionable to have the background image projected onto the person. The background projector 206 provides an additional light source that can also be annoying and generally make the person's interaction with the background image more difficult.

Figure 11:
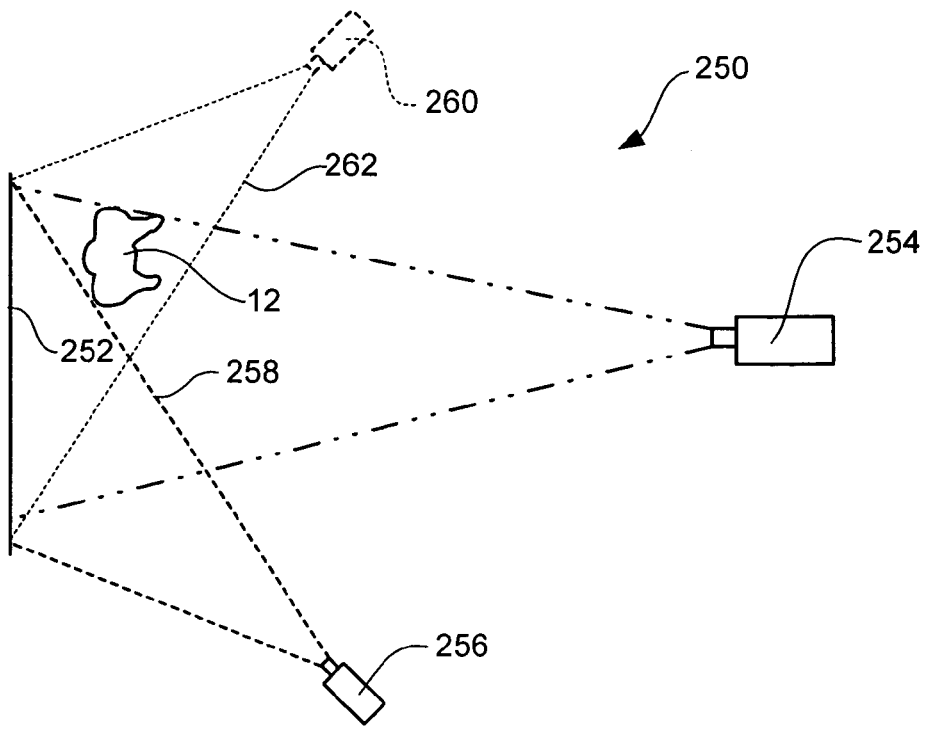
FIG. 11 is a top view of a chromakey video segmentation system incorporating an embodiment of an asynchronous camera/projector system having one or two front projectors positioned at a high skew angle.

There are a number of approaches that can be taken to address these potential problems. One approach is to modify the position of the projector. Shown in FIG. 11 is a top view of an embodiment of a front projection asynchronous video segmentation system 250. In this embodiment, the person 12 stands in front of the key color screen 252, and the camera 254 records the live image, while a front projector 256 is positioned at a high skew angle to the screen, and projects the background image in a projection path 258 to the screen. Given the high skew angle, an appropriate keystone correction can be made to the projector so that the image does not appear distorted.

Advantageously, the high skew angle makes it possible for the person 12 to stand near the screen 252 and within the field of view of the camera 254 to interact with the projected image, while still staying outside the projection path 258 from the projector 256. This condition is shown in FIG. 11. Additionally, if the person does move into the projection path, the high skew angle will tend to minimize the shadow that is produced, and also cause the shadow to strike the screen in a position that is significantly offset from the person's actual position seen from the point of view of the camera. In other words, if the person attempts to point to a particular location on the screen, the position of their shadow will be offset from that position, depending upon the distance of the person's hand in front of the screen. This can make it easier to interact with the image, despite any shadows. Additionally, since the projector 256 projects from a position that is far to the side of the camera 254, it is less likely to present light interference and annoyance to the person 12, who is likely to face away from the projector much of the time.

Alternatively, as also shown in FIG. 11, a second high skew angle projector 260 (shown in dashed lines) can also be added to help mitigate shadows projected onto the screen 252. In this embodiment, the second projector is in sync with the first projector 256, and projects the same background image to the same position on the screen, but from a significantly different angle. This camera can also be adjusted with an appropriate keystone correction to prevent distortion of the image, and adjusted and aimed so that the images projected by the first and second projectors overlay and are aligned with each other. Because of the different skew angle of the second projector 260, any shadow produced by the second projector will likely have a significantly different position on the screen than a shadow produced by the first projector 256. Thus, if the person is within the projection path 262 of the second projector but not within the projection path 258 of the first projector (or vice versa), the entire background image will still be visible to the person.

Additionally, even if the person 12 moves into a position that is within both projection paths 258, 262, the respective shadows from each projector 256, 260 can be entirely separate (depending upon the position of the person and the projectors), or, at least, the shadows are likely to have a much smaller coincident area. Consequently, shadows can be substantially reduced, and projection of the background image upon the person can also be reduced. It will also be apparent that while two projectors are shown in FIG. 11, the system can be provided with more than two projectors, and the positions can vary in a variety of ways to reduce interference of the foreground object(s) with front projection of the background image.

In the various embodiments described above, there is described a system wherein the monochromatic surface of a chroma key image system is replaced with a rear-projection screen, having an image projected upon it with which a person in the foreground can interact. The camera that records the foreground image and background surface is operated out of phase with the rear projection unit, either by color, or in time, or spatially, so that the camera does not capture light coming from the projector, and thus does not "see" the image being projected behind the user. The foreground and background images are then combined in the standard chroma key way, to produce a composite image.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. An asynchronous camera/projector system, comprising:
   a projection screen, having a key color;
   a projector, oriented to provide a sequenced background image to the screen;
   a camera, located in front of the screen, oriented to capture a sequenced image of the screen and a real object positioned in front of the screen, the camera and projector operating out of phase, so that the camera does not record the background image; and
   wherein the projection screen is a rear projection screen, and the projector and camera are located on and oriented toward opposite sides of the screen.

2. A system in accordance with claim 1, further comprising a chroma key processor, configured to replace portions of the camera image having the key color with the background image.

3. A system in accordance with claim 1, wherein the camera and projector are chromatically asynchronous.

4. A system in accordance with claim 3, wherein the camera and projector each include a rotating color wheel having corresponding color filter segments, the rotation of the color wheel of the projector being synchronized and out of phase with the rotation of the color wheel of the camera.

5. A system in accordance with claim 1, wherein the camera and projector are temporally asynchronous.

6. A system in accordance with claim 1, wherein camera and projector are spatially asynchronous.

7. A video segmentation system, comprising:
   a chroma key screen, having a key color;
   a background image processor, configured to produce a sequenced background video image;
   a projector, interconnected to the background image processor and oriented to project a sequenced real background image to the screen;
   a camera, oriented to capture a sequenced image of the screen and a real object positioned in front of the screen;
   a chroma key processor, interconnected to the camera and the background image processor, configured to replace portions of the camera image having the key color with the background image, the camera and projector operating in synchronization, but out of phase, whereby the real background image is visible to a person viewing the screen but is not visible to the camera; and
   wherein the camera and projector are chromatically asynchronous, and the camera and projector each include a rotating color wheel having corresponding color filter segments, the rotation of the color wheel of the projector being synchronized and out of phase with the rotation of the color wheel of the camera.

8. A video segmentation system in accordance with claim 7, wherein the screen is a rear projection screen and the projector is located behind the screen, and the camera is located in front of the screen.

9. A video segmentation system in accordance with claim 7, wherein the color wheels of the projector and camera each include red, green, and blue filter segments.

10. A video segmentation system in accordance with claim 7, wherein the camera and projector are located on and oriented toward a common side of the screen.

11. A method for producing a composite image, comprising the steps of:
   a. sequentially projecting a background image to a projection surface having a key color;
   b. sequentially recording a foreground image of the projection surface and an object positioned in front of the projection surface at a common rate but out of phase with the sequential projection, such that the foreground image includes substantially no part of the background image; and
   c. combining the background image with the foreground image using a chroma key processor, whereby the background image is visible to a person viewing the projection surface, wherein the step of sequentially projecting the background image comprises projecting sequential color component images, and the step of sequentially recording the foreground image comprises recording sequential color component images, the sequence of the background image being out of phase with the color sequence of the foreground image.

12. A method in accordance with claim 11, wherein the projection surface comprises a rear projection screen and the step of projecting the background image comprises projecting the background image to a rear surface of the screen, and the step of recording the foreground image comprises recording an image from a viewpoint oriented toward a front surface of the screen.

13. A method in accordance with claim 11, wherein the step of projecting the background image comprises projecting the background image to a front of the projection surface, and the step of recording the foreground image comprises recording an image from a viewpoint oriented toward the front of the projection surface.

14. An asynchronous camera/projector system, comprising:
   a projection screen, having a key color;
   a projector, oriented to provide a sequenced background image to the screen;
   a camera, located in front of the screen, oriented to capture a sequenced image of the screen and a real object positioned in front of the screen, the camera and projector operating out of phase, so that the camera does not record the background image; and
   wherein the camera and projector each include a rotating color wheel having corresponding color filter segments, the rotation of the color wheel of the projector being synchronized and out of phase with the rotation of the color wheel of the camera.

15. An asynchronous camera/projector system, comprising:
   a projection screen, having a key color;
   a projector, oriented to provide a sequenced background image to the screen;
   a camera, located in front of the screen, oriented to capture a sequenced image of the screen and a real object positioned in front of the screen, the camera and projector operating out of phase, so that the camera does not record the background image; and
   wherein the projector and camera are located on and oriented toward a common side of the screen, and wherein the projector is positioned with a high skew angle relative to the screen and a viewpoint of the camera.

16. A system in accordance with claim 15, further comprising multiple projectors, each positioned with a high skew angle relative to the screen and a viewpoint of the camera, each projector configured to project the background image to a common location on the screen.

* * * * *